(12) United States Patent
Steve (10) Patent No.: US 9,351,154 B1
(45) Date of Patent: May 24, 2016

(54) WIRELESS ADVERTISING TO INITIATE PAIRING

(71) Applicant: MICROSOFT TECHNOLOGY LICENSING, LLC, Redmond, WA (US)

(72) Inventor: Herndon Steve, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 14/629,316

(22) Filed: Feb. 23, 2015

(51) Int. Cl.
| | |
|---|---|
| H04M 3/00 | (2006.01) |
| H04W 8/22 | (2009.01) |
| H04W 4/00 | (2009.01) |
| H04W 76/02 | (2009.01) |
| H04M 3/42 | (2006.01) |

(52) U.S. Cl.
CPC ............. *H04W 8/22* (2013.01); *H04W 4/008* (2013.01); *H04W 76/023* (2013.01); *H04M 3/42178* (2013.01); *H04M 2250/64* (2013.01)

(58) Field of Classification Search
CPC ..... H04W 88/06; H04W 4/008; H04W 48/18; H04W 72/1215; H04W 84/12; H04W 76/02; H04W 76/023; H04W 8/005; H04W 8/18; H04W 28/18; H04W 40/246; H04M 1/7253; H04M 3/42178; H04M 2250/64
USPC ........................... 455/418, 419, 41.2; 370/338
See application file for complete search history.

(56) References Cited

U.S. PATENT DOCUMENTS

| | | |
|---|---|---|
| 8,483,613 B2 | 7/2013 | Hua |
| 8,737,917 B2 | 5/2014 | Desai et al. |
| 2008/0057868 A1 | 3/2008 | Chang |
| 2008/0233887 A1* | 9/2008 | Singh .................... H04W 8/245 455/73 |
| 2012/0052802 A1 | 3/2012 | Kasslin et al. |
| 2012/0258669 A1 | 10/2012 | Honkanen et al. |

(Continued)

FOREIGN PATENT DOCUMENTS

| | | |
|---|---|---|
| EP | 2744233 A2 | 6/2014 |
| WO | 2010094965 A1 | 8/2010 |

(Continued)

OTHER PUBLICATIONS

Galeev, Mikhail, "Bluetooth 4.0: An introduction to Bluetooth Low Energy—Part I", Published on: Jul. 14, 2014 Available at: http://www.eetimes.com/document.asp?doc_id=1278927.

(Continued)

*Primary Examiner* — Olumide T Ajibade Akonai
(74) *Attorney, Agent, or Firm* — Sunah Lee; Judy Yee; Micky Minhas (57) ABSTRACT

Embodiments relate to configuring a wireless device. The wireless device has a first module implementing a first wireless protocol and a second module implementing a second wireless protocol. After the wireless device identifies a need to configure a second wireless protocol, the wireless device begins periodically wirelessly broadcasting advertisement packets by the first module. Each advertisement packet has a payload storing a configuration request indicator. A host receives one of the advertisement packets, optionally establishes, with the first protocol, a channel with the wireless device. The host transmits a reply packet of the first protocol that contains configuration data for the second wireless protocol. The wireless device uses the reply packet to configure itself for connectivity using the second wireless protocol.

20 Claims, 8 Drawing Sheets

(56) References Cited

U.S. PATENT DOCUMENTS

| | | |
|---|---|---|
| 2013/0109315 A1 | 5/2013 | Polo et al. |
| 2013/0215467 A1* | 8/2013 | Fein .................... G06F 3/1204 358/1.15 |
| 2014/0157135 A1 | 6/2014 | Lee et al. |

FOREIGN PATENT DOCUMENTS

| | | |
|---|---|---|
| WO | 2013184110 A1 | 12/2013 |
| WO | 2014080252 A1 | 5/2014 |

OTHER PUBLICATIONS

Liu, et al, "Energy Analysis of Neighbor Discovery in Bluetooth Low Energy Networks", In Techinical Report, Jul. 2012, 11 pages.

Galeev, Mikhail, "Make the most of Bluetooth LE advertising mode", Published on: Apr. 9, 2013 Available at: http://www.eetimes.com/document.asp?doc_id=1280724.

"Bluetooth Low Energy", Published on: Jul. 28, 2013 Available at: https://developer.android.com/guide/topics/connectivity/bluetooth-le.html.

* cited by examiner

WIRELESS ADVERTISING TO INITIATE PAIRING

BACKGROUND

Computing devices often lack configuration parameters necessary for establishing wireless connections. Newly issued, reset, or reconfigured wireless-capable devices (hereafter "devices") may lack configuration settings needed for use of a wireless protocol such as an IEEE 802.11 protocol. Configuration settings for a wireless protocol are sometimes absent or are inapplicable to any nearby wireless access points. In this common case, a user must manually configure the device. Manual configuration usually requires a user to input to the wireless device information about a wireless network or access point with which wireless connectivity is desired. However, manually configuring a device for establishing a wireless connection can have disadvantages and limits. Some unconfigured devices, such as sensors embedded in a structure, are difficult to physically access. Some devices have unwieldy and unintuitive input means. In addition, errors can occur during manual entry of configuration parameters; incorrect or mis-entered configuration parameters are common and can be difficult to identify when wireless connectivity is not established.

Techniques discussed below may help to address some of these configuration issues by using secondary wireless protocols to configure devices to connect to networks or access points using primary wireless protocols.

SUMMARY

The following summary is included only to introduce some concepts discussed in the Detailed Description below. This summary is not comprehensive and is not intended to delineate the scope of the claimed subject matter, which is set forth by the claims presented at the end.

Embodiments relate to configuring a wireless device. The wireless device has a first module implementing a first wireless protocol and a second module implementing a second wireless protocol. After the wireless device identifies a need to configure a second wireless protocol, the wireless device begins periodically wirelessly broadcasting advertisement packets by the first module. Each advertisement packet has a payload storing a configuration request indicator. A host receives one of the advertisement packets, optionally establishes, with the first protocol, a channel with the wireless device. The host transmits a reply packet of the first protocol that contains configuration data for the second wireless protocol. The wireless device uses the reply packet to configure itself for connectivity using the second wireless protocol.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to automatic configuration of a device by the device using a first wireless protocol to broadcast packets advertising the device's unconfigured state, which initiates use of the first wireless protocol to provision configuration parameters for a second wireless protocol. Discussion will begin with a general scenario of an unconfigured device and an overview of how a first wireless protocol is used to configure the device. This is followed by discussion of features of relevant protocols and the information exchanged therewith between an unconfigured device and a host are then described. Implementation details and variations are then explained.

Figure 1:
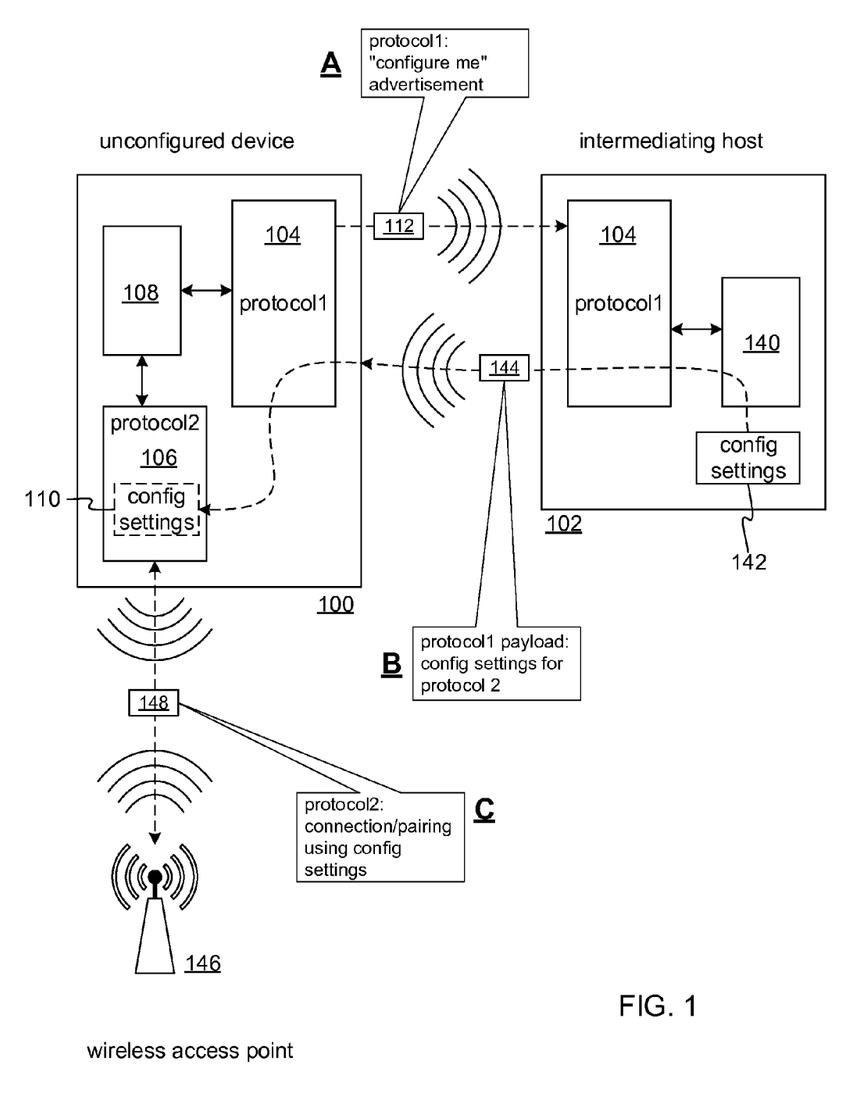
FIG. 1 shows a wireless device being configured by a host.

FIG. 1 shows a wireless device 100 being configured by a host 102. The wireless device 100 and host 102 may be any type of computing devices and respectively have processing hardware, a radio or wireless network interface card, storage memory, and appropriate software in the form of instructions for the processing hardware, which will include at least a rudimentary operating system with a communication protocol stack. The type or form factor of the devices is not significant. For example, either device might be a laptop computer, a peripheral device such as a printer, a mobile telephone, a desktop workstation, a network device such as a router, etc.

The communication stacks of the wireless device 100 and the host 102 include implementations of a first protocol 104 and a second protocol 106. The term "implementation" refers to any modules, processes, programs, or the like that, when executed by processing hardware, function in a way that satisfies the requirements or specifications of a corresponding protocol, for instance, by maintaining and transitioning between communication states, parsing incoming packets, forming outgoing packets, etc. An implementation can also be a dedicated protocol chip with a coin cell battery, an antenna, etc. This description occasionally omits the term "implementation". As used herein, whether the term "protocol" refers to a protocol per se or to an implementation of a protocol will be apparent from context.

At an initial stage A, a beaconing program 108 checks for the presence or content of local configuration settings 110 for the second protocol 106. This can be performed in numerous ways. For example, the beaconing program 108 can check the contents of a configuration file managed by a file system, query a configuration data store, invoke an network application programming interface (API) of the operating system to determining the current configuration state of the implementation of the second protocol, check a flag indicating whether a configuration process has been performed for the wireless device 100 or for its implementation of the second protocol 106 has (e.g., whether the wireless device 100 has been reset or is in a factory default state), and so forth. In one embodiment, if the same radio can be used for both the first protocol 104 and the second protocol 106 (or if a radio for the second protocol can be used with minimal power consumption), the wireless device can use its radio to detect the presence of signals of the second wireless protocol and condition beaconing on the presence of those signals. In other words, the wireless device 100 can avoid beaconing until another node appears to be available for communication via the second protocol 106. It is also possible to use a notification system provided by an operating system to avoid notification overload when the host 102 has received multiple beacon packets, perhaps from different wireless devices. For example, a notification can be displayed to indicate that one or more devices have been detected with a user interface element to allow a user to initiate a connection for all, some, or none of the detected devices.

The use of a distinct beaconing program 108 is only a convenience. The configuration-related logic of the beaconing program 108 can also be performed by the implementations of either the first or second protocols, by an element of the network stack, a configuration daemon/server executing on the wireless device 100, etc.

Regardless of how it is determined that the wireless device 100 has an unconfigured status, when the wireless device 100 determines that there is a need to configure the second protocol 106, the beaconing program 108 employs the first protocol 104 to advertise its unconfigured state. To this end, any of a variety of protocols for the physical/medium/link layers can be used. For example, the first and/or second protocols may be variants of the Bluetooth Low-Energy™ (i.e., Bluetooth LE, Bluetooth 4.0, or Bluetooth Smart) protocol, ZigBee™, Thread™, IEEE 802.15, 802.11 (WiFi), etc. Preferably, the first protocol 104 includes features for low-power connectionless broadcasting of packets for advertising device presence, as well as features for listening for those advertisement packets. For example, the Bluetooth LE protocol specifies an advertisement packet format that has a customizable payload. That payload can be used to carry information signaling the configuration status of the wireless device 100. Similar beacon or advertisement packets of other protocols may be used instead. In other embodiments, unused or insignificant standard packet header fields may be used.

Figure 2:
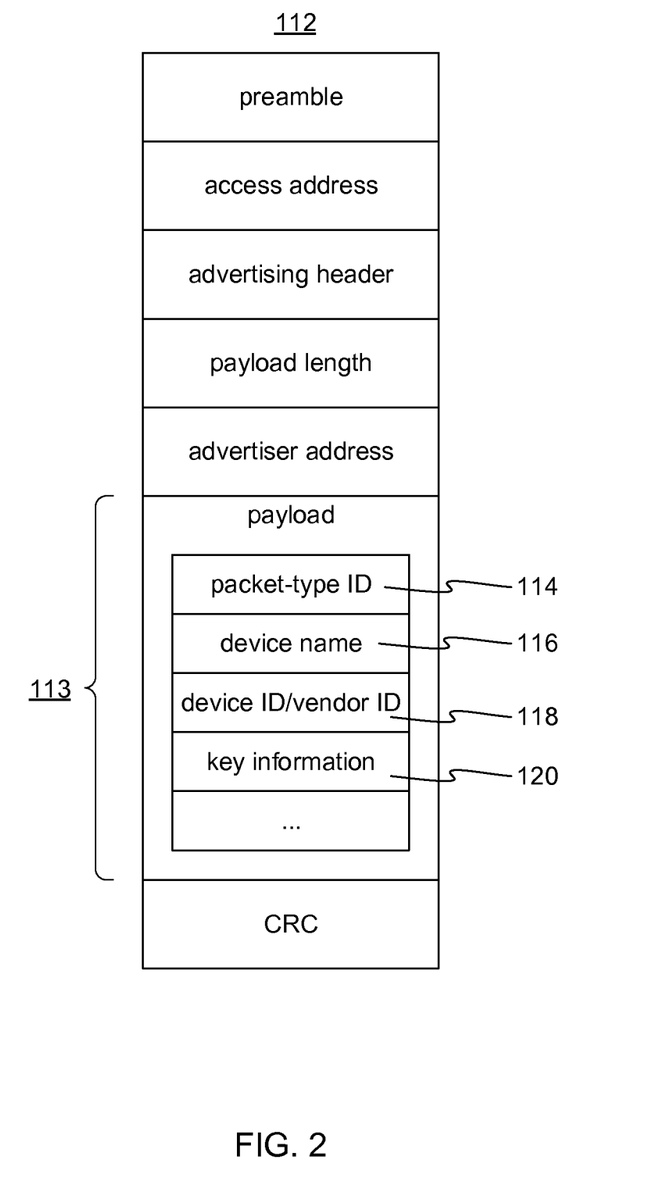
FIG. 2 shows an example of an example of an advertisement packet.

The beaconing program 108 instructs the implementation of the first protocol 104 to begin broadcasting advertisement packets 112. FIG. 2 shows an example of an example of an advertisement packet 112. The beaconing program 108 may pass values to the first protocol 104 for encapsulation in the advertisement packets 112 of the first protocol. The first protocol 104 builds the protocol-compliant advertisement packet 112 by placing the values in standard packet header fields and/or custom fields within a protocol-defined payload field 113. Without limit or requirement, the values provided by the beaconing program 108 may correspond to fields such as a configuration identifier or packet type field 114, a device name field 116, a device or vendor identifier field 118, a key information field 120, or other information. A packet-type value provided by the beaconing program 108 for the packet type field 114 indicates that the advertisement packet 112 is advertising the configuration status (e.g., unconfigured) of the wireless device 100. Different values may, by convention, indicate different configuration states and/or different protocols to be configured. For example, the packet-type value may be an alphanumeric character string or a numeric code that identifies the second protocol. The device name value may be a string of text describing the wireless device, for instance "Pat's Phone". The advertisement packets 112 are broadcast without requirement of any prior pairing or connection establishment with any potential recipient. That is, the advertisement packets 112 need not be addressed to any particular device, and any device in range of the wireless device 100 may receive the packets and decided whether to service them.

Next, at step B, the host 102 receives one of the advertisement packets 112. The implementation of the first protocol 104 on the host 102 provides the packet to a listener program 140. As with the beaconing program 108, the listener program 140 is only a convenience. The functionality of the beaconing program 108 may be performed by the first protocol 104, for example. The listener program 140 analyzes the content of the received packet. In particular, the listener program 140 tests for the presence of values in one or more fields of the packet that indicate that the packet is advertising a configuration solicitation. For example, the presence of a packet-type value may indicate the nature of the packet and trigger configuring service by the host 102. Other features of the packet may signal the nature of the packet. For example, the format of the content of the payload field 113 (the data types and locations of values in the payload field 113), a combination of values in fields (e.g., a vendor ID and a device type), or other information can be built into the packet to indicate a configuration request. The listener program 140 may have a white-list of identifiers (e.g., device identifiers, vendor identifiers, device-type identifiers) that are pre-defined for configuration processing. The listener program 140 may also determine which protocol of the wireless device 100 is to be configured, which might be discerned from a particular field of the advertisement packet 112, or from which protocol configuration parameters are available on the host 102, and so forth. In one embodiment, the listener program may send configuration data for multiple protocols. After some optional security steps (discussed further below), the host 102 obtains configuration settings 142 for the request from storage, encapsulates them in a reply packet 144 compliant with the first protocol 104, and transmits the reply packet 144 to the host 102.

Figure 3:
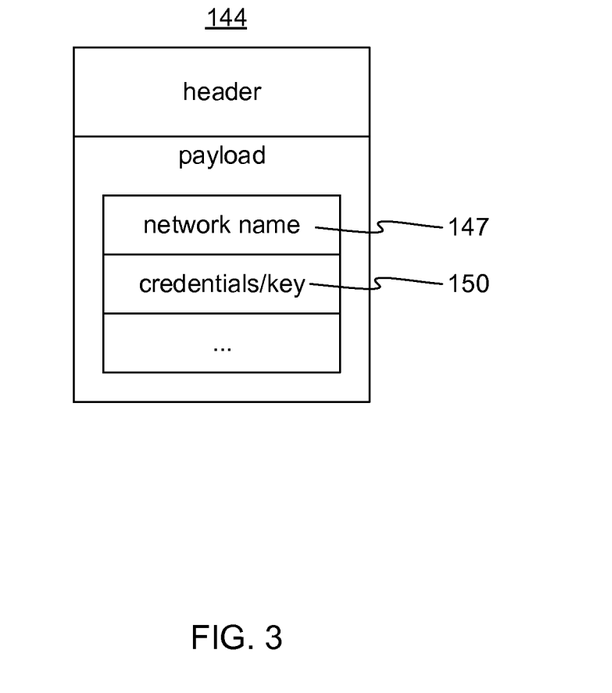
FIG. 3 shows an example of the reply packet.

FIG. 3 shows an example of the reply packet 144. The reply packet 144 may have any form parseable by the first protocol 104 of the wireless device 100. In the example of FIG. 3, the reply packet includes the configuration data in the payload. The configuration data may be any information that enables configuration of the wireless device 100 to enable connectivity with a particular wireless network or wireless access point 146. For example, the reply packet 144 may have a network name 147 or identifier of the wireless access point 146, a security key 150 or passcode, a security token, a network or machine access control (MAC) address of the wireless access point 146, etc.

As with the beaconing program 108, the listener program 140 can be implemented by a component of a network protocol stack, a server program, a wireless network interface, a dedicated hardware device, etc. In addition, the host 102 may or may not have an implementation of the target second protocol 106 for which configuration is being requested. If the host 102 does have an implementation, the configuration settings 142 may be obtained directly from the same storage that configures the implementation of the second protocol 106, for example, from a configuration file associated with an implementation of the second protocol (if assumed to be up-to-date and functioning). In practical applications, the host 102 will also be using the second protocol 106 and will have network-layer connectivity through the wireless access point 146.

At step C, the host 102 receives the reply packet 144 via the first protocol 104. The values in the fields of the reply packet 144 are extracted and stored as local configuration settings 110 for the second protocol 106. The beaconing program 108 may extract and store the configuration values, or an augmentation of the implementation of the first protocol 104 (which presumably has access to a networking API of the operating system) handles the storing and extraction. After the local configuration settings 110 are stored, if necessary, the second protocol 106 is activated and a connection or pairing process for the second protocol 106 is automatically initiated. Specifically, the local configuration settings 110 are used to contact the wireless access point and establish network connectivity for the wireless device 100. A connection/pairing packet 148 compliant with the second protocol 106, and containing one or more values obtained from the host 102, is transmitted to the wireless access point 146. In one embodiment, configuration parameters in the reply packet 144 are directly used to form the connection/pairing packet 148, and then the local configuration settings 110 are updated as a side-effect of the process of establishing the connection/pairing with the wireless access point 146. If a connection using the obtained configuration settings is determined to be unsuccessful, an appropriate message may be displayed and the configuration process may optionally be repeated.

Figure 4:
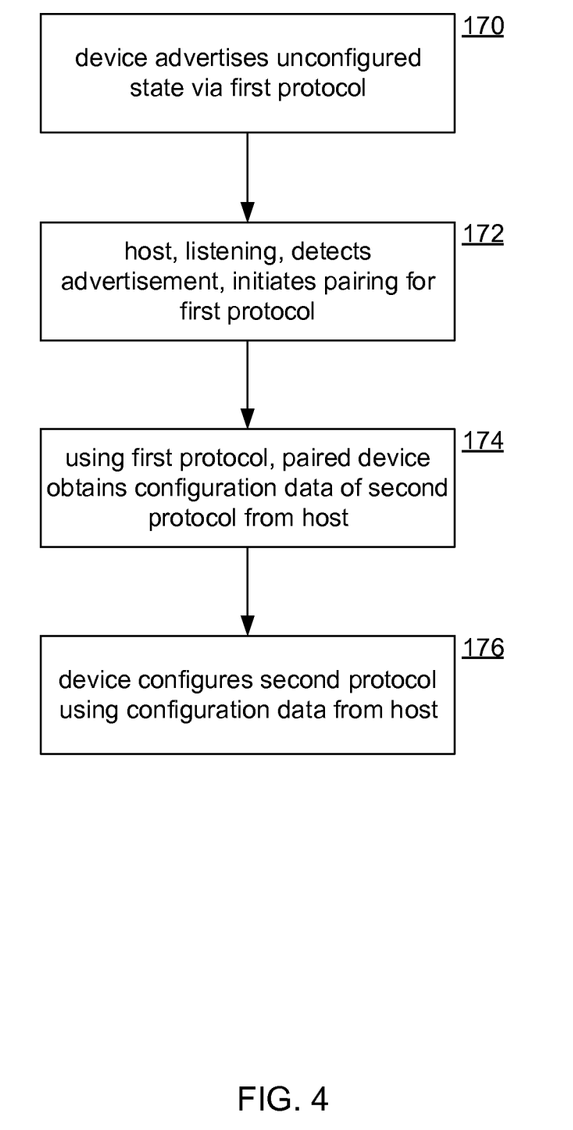
FIG. 4 shows an overview of a process for using a first protocol to bootstrap connectivity for a second protocol.

FIG. 4 shows an overview of a process for using the first protocol 104 to bootstrap connectivity for the second protocol 106. Initiation of the process of FIG. 4 may be conditioned on the wireless device 100 determining that it lacks one or more configuration parameters for the second protocol 106, that it has not successfully paired/connected using the second protocol 106, etc. At step 170, the wireless device 100 begins advertising its unconfigured state via the first protocol 104. Generally, this involves broadcasting beacon or advertisement packets according to the first protocol. The broadcasted packets may be any type of packet that will be parsed by a recipient without first soliciting the packet or without first requiring a connection or pairing, thus giving any recipient an opportunity to recognize and act on the packet. In one embodiment, the receiving host 102 may be able to request additional packets without connecting/pairing with the wireless device 100, and those additional packets can be used to establish trust or inform a pairing process of the first protocol 104.

At step 172, the host 102, which is actively listening for beacon/advertisement packets of the first protocol, receives one of the configuration-initiating packets. In one embodiment, the host 102 may provide configuration parameters for the first protocol without any security or verification steps. In another embodiment, security steps may be performed before the host 102 transmits connection-enabling parameters for the second protocol. At step 174 the wireless device 100 receives the packet containing the connection parameters for the second protocol. At step 176, the wireless device configures itself for the second protocol, and proceeds to connect to a wireless network or access point using the second protocol and the configuration parameters received from the host 102. The host 102 may ignore advertisements from a same wireless device 100 after providing configuration parameters some threshold number of times.

Figure 5:
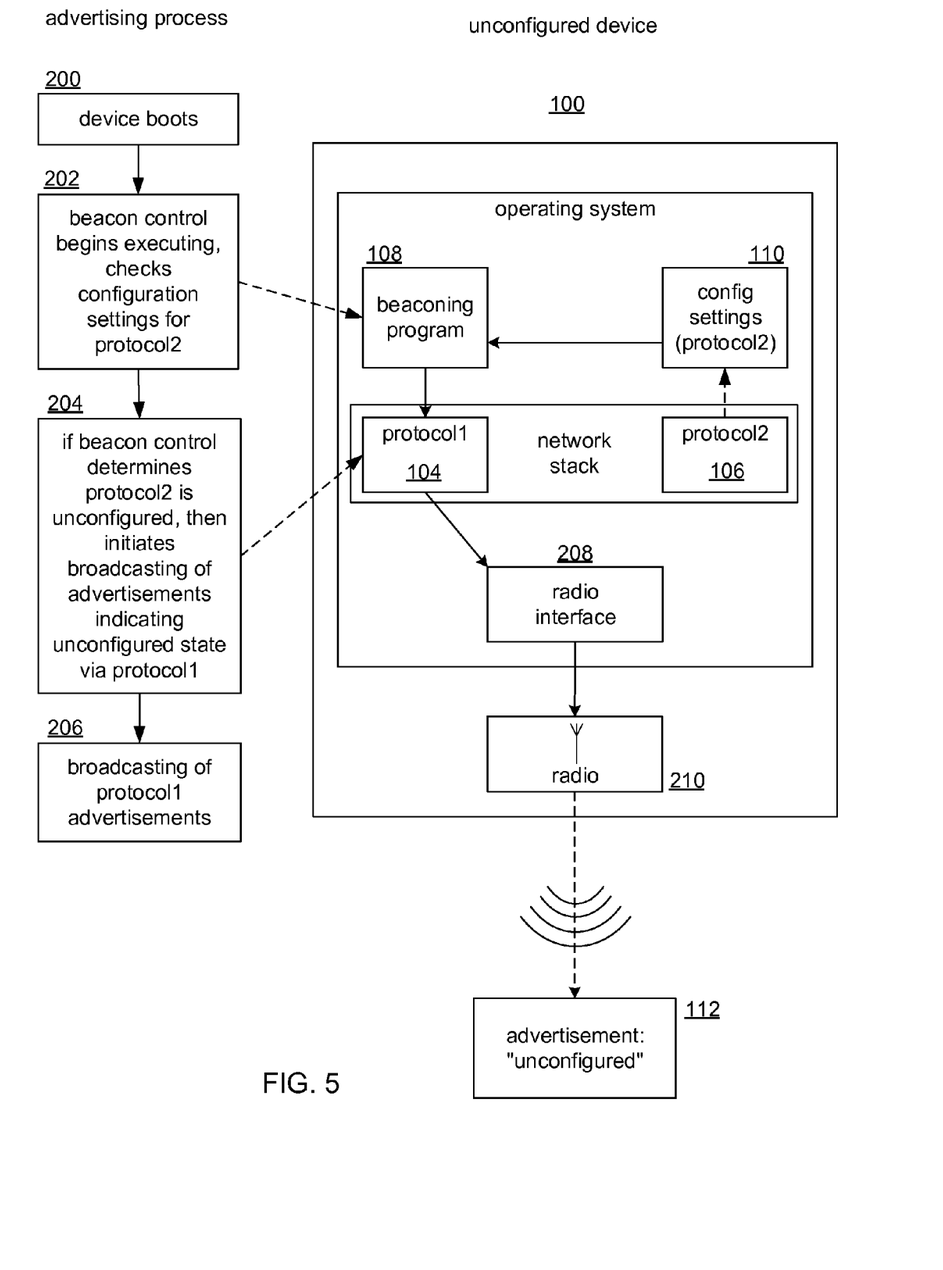
FIG. 5 shows a detailed view of the wireless device when initially lacking configuration for the second protocol.

FIG. 5 shows a detailed view of the wireless device 100 when initially lacking configuration for the second protocol. An advertising process begins, for example, at step 200 when the wireless device boots. The beaconing program 108 begins executing at step 202 and checks the local configuration settings 110 for the second protocol 106. At step 204, the content of the local configuration settings 110 are evaluated, and, if determined to be insufficient or missing, then beaconing begins at step 206, and beacon or advertisement packets 112 are transmitted using the first protocol 104, a radio interface 208, and a radio 210.

Figure 6:
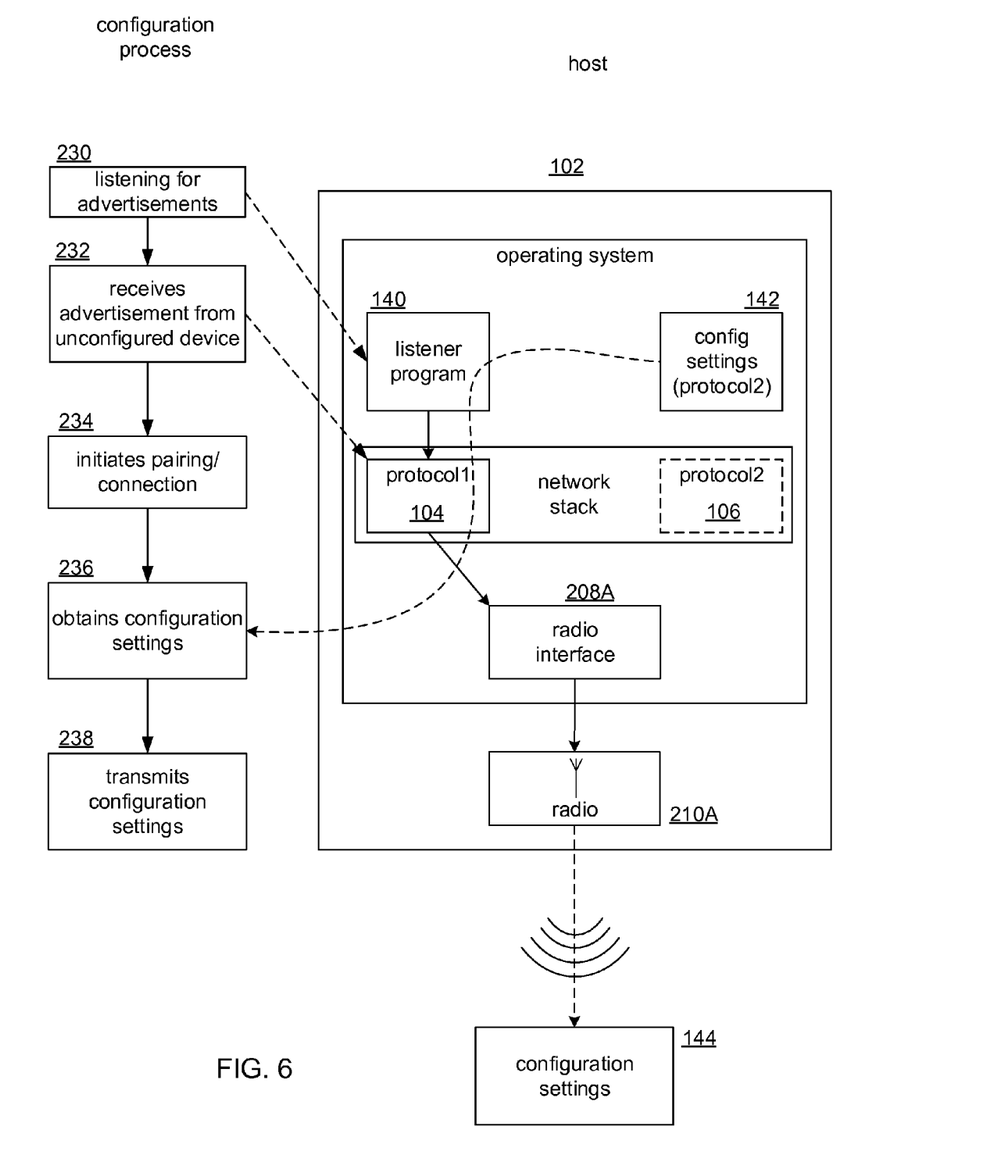
FIG. 6 shows a detailed view of the host handling an advertisement packet.

FIG. 6 shows a detailed view of the host 102 handling an advertisement packet 112. Initially, at step 230, the host 102, is actively listening for advertisements using its radio interface 208A and radio 210A. At step 232 the listener program 140 receives the configuration request. The host 102 may first make sure that the transmitter of the request packet—the wireless device 100—is sufficiently close by comparing a received signal strength indicator (RSSI) value with a minimum value. This can help assure that the transmitter is not a distant eavesdropper. For example, an RSSI floor may correspond to a distance of 3 meters. In one embodiment, the RSSI floor may vary according to a feature or type of the wireless device 100. The RSSI minimum (i.e., a provisioning qualification parameter) can also be maintained in the configuration settings 142 in order to control the connection provisioning process of the host 102, or to provide the parameter to the wireless device 100 (should the wireless device 100 in turn become a connection-configuration provisioner), or both.

If the RSSI of the host 102 indicates that the transmitter is sufficiently close, then the host 102 may initiate a security exchange with the wireless device 100 to further assure that the wireless device 100 is not an unauthorized device. For example, the host 102 may display a message noting that the wireless device 100 was detected, possibly showing a name or other information about the wireless device per the payload of the request packet (see FIG. 7). The host 102 code, a picture, a sequence of color patches, etc. The host 102 sends a packet of the first protocol 104 that informs the wireless device 100 that security information is being displayed. The wireless device 100 responds by prompting the user of the wireless device to provide input to the wireless device 100. The input is transmitted to the host 102 via the first protocol. The host 102 compares the input with the displayed security information and, if it matches, then at step 236 the configuration settings are obtained from storage and at step 238 the host 102 transmits the configuration settings 142. Step 238 may involve establishing, according to the first protocol, a formal pairing, connection, channel, etc. to convey the configuration settings 142. In another embodiment, connectionless exchanges (for instance, requests for more advertisement information, additional beacon broadcasts, etc.) may be used to pass the configuration settings 144 to the wireless device 100.

Figure 7:
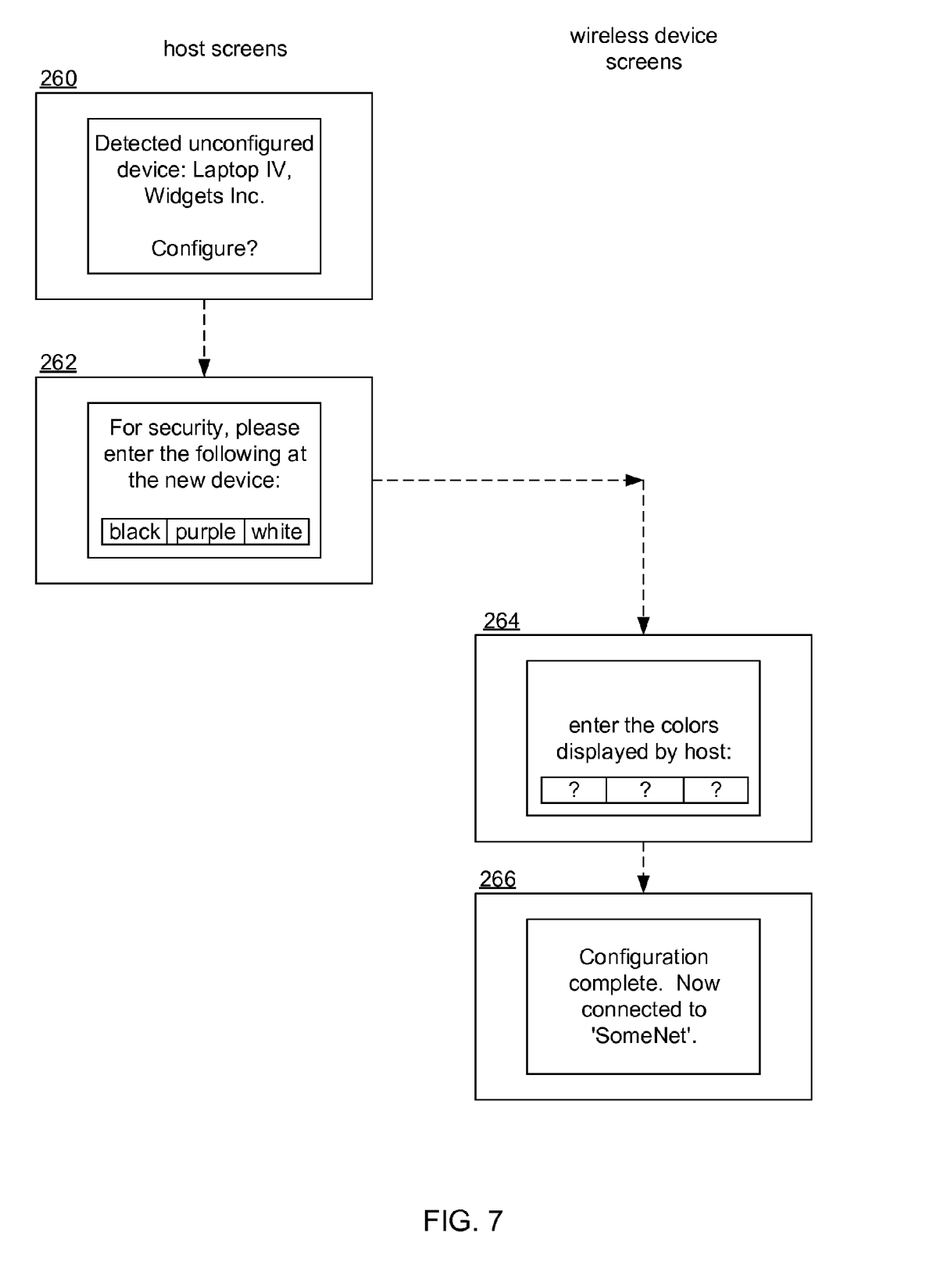
FIG. 7 shows an example a sequence of screen displays to verify that the user has physical access to the host.

FIG. 7 shows an example a sequence of screen displays to verify that the user has physical access to the host 102. When the host 102 receives a broadcasted configuration request packet from the wireless device 100, the host displays a first screen 260, possibly confirming that configuration should proceed or displaying information identifying the wireless device 100 based on information in the configuration request packet. If the user approves configuring the wireless host 100, the host 102 optionally displays a second screen 262 showing security information such as randomly selected colors (e.g., "black", "purple", and "white") or a randomly generated pin (e.g., "4233"). When the wireless device 100 receives confirmation of receipt of the configuration request packet, the wireless device 100 displays a third screen 264 for the user to provide input matching the displayed security information (e.g., the user types in "4233"). The inputted security information is transmitted via the first protocol to the host 102, which verifies same and provides the configuration data for the second protocol 106 to the wireless device 100. The wireless device 100 attempts to connect with a wireless access point, a peer, etc., using the second wireless protocol and the configuration data. If connectivity is established, the wireless device 100 in turn displays a fourth screen 266 indicating that the configuration was successful.

In one embodiment, the beaconing and configuration process may be performed without full operation of the wireless device 100. For example, if the first protocol 104 is implemented by a battery powered self-contained communication interface (a "protocol on a chip"), the interface can issue advertisements and acquire configuration parameters even when the rest of the wireless device 100 is inactive or unpowered. The hardware implementing the first protocol 104 will autonomously advertise, collect configuration parameters for the second protocol, store them, and make them available to the wireless device 100 when the wireless device 100 boots up.

Figure 8:
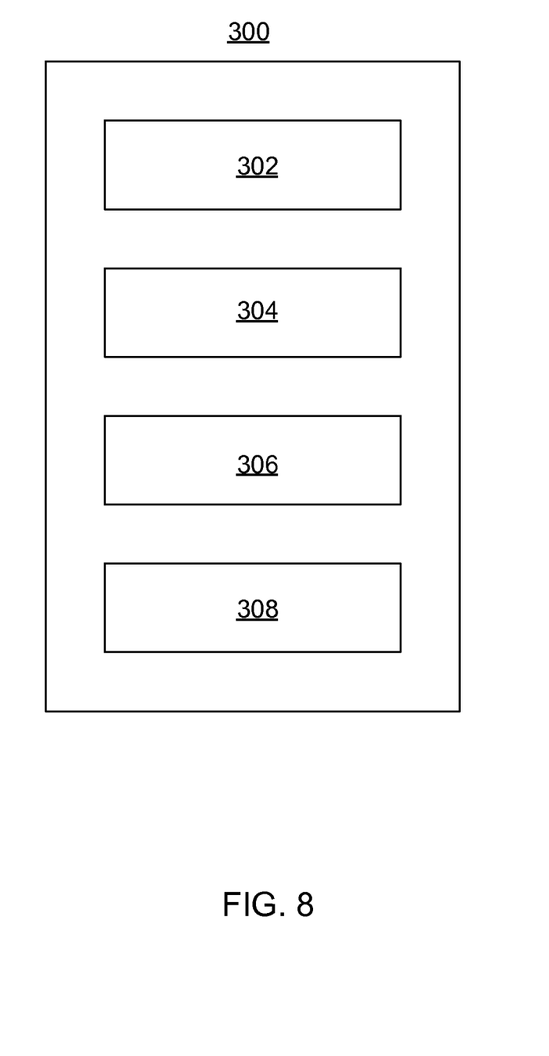
FIG. 8 shows an example computing device.

FIG. 8 shows an example computing device 300 that may serve as any of the wireless devices or hosts discussed above. The computing device 300 may have processing hardware 302, which can be a general purpose central processing unit, a graphics processing unit, a digital signal processor, a field programmable gate array, etc., or combinations thereof. Storage hardware 304 may store information for the processing hardware 302. The storage hardware 304 may be optical storage (e.g., compact-disk read-only memory (CD-ROM)), magnetic media, random access memory (RAM), read-only memory (ROM), flash RAM or other static re-writeable memory, other means of storing digital information in a physical item or apparatus that can be accessed by the computing device 300 at speeds comparable to clock speeds, or combinations thereof. The stored information can be in the form of machine executable instructions (e.g., compiled executable binary code), source code, bytecode, or any other information that can be used to enable or configure computing devices to perform the embodiments described herein. The computing device 300 may further comprise a network interface 306, which may be wireless as discussed above. The network interface 306 may be a single radio capable of implementing different wireless protocols or there may be a different interface for each protocol. The network interface 306 may also be a software-defined radio. The computing device 300 may also include a display 308 and any of a variety of known input devices to allow a user to interact with and operate the computing device 300.

The invention claimed is:

1. A device comprising:
   a radio;
   processing hardware; and
   storage storing instructions executable by the processing hardware;
   the processing hardware configured to, when the device is operating, execute the instructions to perform a process, the process comprising:
      determining that the device has an unconfigured status of a second protocol;
      responsive to the determining, broadcasting advertisement packets from the radio using a first protocol implementation that executes on the device to implement a first protocol, each advertisement packet conforming to the first protocol and comprising a field indicating that the device has an unconfigured status;
      receiving a configuration packet via the radio, the configuration packet conforming to the first protocol and handled by the first protocol implementation, the configuration packet comprising configuration data;
      responsive to the configuration packet, storing the configuration data in the storage; and
      executing a second protocol implementation that implements the second protocol, wherein the second protocol implementation uses the configuration data to establish a connection with a corresponding wireless device.

2. A device according to claim 1, wherein the configuration data comprises a key, and wherein the establishing the connection comprises the wireless device receiving the key from the device and verifying the received key, the key having been sent using a connection packet conforming to the second protocol.

3. A device according to claim 1, wherein the first and second protocols comprise wireless protocols defined for the physical and data link layer.

4. A device according to claim 3, wherein the second protocol comprises a protocol conforming to an IEEE 802.11 protocol.

5. A device according to claim 4, wherein the first protocol comprises a protocol conforming to a Bluetooth protocol standard.

6. A device according to claim 1, wherein the storing the configuration data comprises storing a key in a configuration storage area, and wherein the determining that the device has an unconfigured status comprises determining whether any key is stored in the configuration storage area.

7. A method of configuring a wireless device, the method performed by the wireless device and comprising:
   executing a first module implementing a first wireless protocol;
   in response to determining that a configuration storage area of the wireless device does not contain configuration data, periodically wirelessly broadcasting advertisement packets by the first module, each advertisement packet comprising a respective payload storing a configuration request indicator;
   receiving, from a second device, a reply packet transmitted by the host in at least partial response to having received one of the advertisement packets, and, based on the reply packet, establishing, by the first module, a first connection according to the first wireless protocol, with the second device;
   receiving, from the second device via the connection, configuration data for the second wireless protocol;
   storing the configuration data in the configuration storage area; and
   executing a second module implementing the second wireless protocol, wherein the second module uses the configuration data from the configuration storage area to establish a second wireless connection according to the second wireless protocol.

8. A method according to claim 7, further comprising stopping the periodic broadcasting based on a determination that the wireless device is in, or is entering, a state of being configured for communication using the second wireless protocol.

9. A method according to claim 8, wherein the determination is based on either the receiving of the configuration data or is based on determining that the configuration storage area is storing configuration data for the second wireless protocol.

10. A method according to claim 7, wherein the first wireless protocol comprises a low-energy protocol that defines an advertising packet format for connectionless exchange of information, each of the advertisement packets conforming to the advertising packet format.

11. A method according to claim 10, wherein the configuration data comprises a network identifier or a security key for accessing a wireless network.

12. A method according to claim 7, further comprising:
   receiving user input inputted with the wireless device; and
   transmitting the user input, by the first module, to the second device, wherein the reply packet is transmitted by the second device responsive to the second device verifying that the user input matches security information displayed by the second device.

13. A method according to claim 12, wherein the reply packet is transmitted based on the second device determining that a signal strength of the wireless device satisfies a threshold minimum.

14. A computing device comprising:
a wireless network interface;
storage hardware storing an operating system and a network stack configured to implement a first wireless protocol, the storage hardware also storing configuration parameters for a second wireless protocol;
a processor configured to, when the computing device is operating, execute the operating system and the network stack;
the computing device, when executing, performing a process comprising:
listening for and receiving a broadcasted advertisement packet of the first protocol via the wireless network interface;
analyzing a the advertisement packet to determine that an indicator indicating a configuration request is present in the advertisement packet;
based on the determined presence of the indicator, forming a connection or pairing between the wireless network interface and a wireless device that broadcasted the advertisement packet according to the first wireless protocol; and
further based on the determined presence of the indicator, providing one or more network configuration parameters via the connection or pairing to the wireless device, the one or more network configuration parameters comprising information for establishing a connection according to a second wireless protocol, wherein the wireless device is configured to use the one or more network configuration parameters to communicate according to the second wireless protocol.

15. A computing device according to claim 14, wherein the first wireless protocol and the second wireless protocol are each defined at the physical network layer and at the data link layer.

16. A computing device according to claim 15, wherein the advertisement packet comprises a payload containing the indicator, and wherein the payload further comprises an identifier identifying the wireless device, or a type of the wireless device, or a vendor associated with the wireless device.

17. A computing device according to claim 15, wherein the process further comprises performing a verification process as a prerequisite of forming the connection or pairing.

18. A computing device according to claim 17, wherein the verification process comprises displaying security information on a display of the computing device and receiving from the wireless device a packet, conformant to the first wireless protocol, comprising an indication of the security information that was inputted by a user of the wireless device.

19. A computing device according to claim 14, wherein the advertisement packet was transmitted by the wireless device based on the wireless device having determined that the wireless device lacked configuration information for communicating via the second wireless protocol.

20. A computing device according to claim 14, wherein the one or more configuration parameters comprise a network address of another wireless device, and wherein the wireless device communicates with the other wireless device using the network address.

* * * * *